(12) United States Patent
Dolansky et al.

(10) Patent No.: US 7,174,284 B2
(45) Date of Patent: Feb. 6, 2007

(54) APPARATUS AND METHOD FOR SIMULATION OF THE CONTROL AND MACHINE BEHAVIOR OF MACHINE TOOLS AND PRODUCTION-LINE MACHINES

(75) Inventors: Stefan Dolansky, Altdorf (DE); Thomas Menzel, Erlangen (DE); Wolfgang Papiernik, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 547 days.

(21) Appl. No.: 10/690,484

(22) Filed: Oct. 21, 2003

(65) Prior Publication Data
US 2005/0090929 A1 Apr. 28, 2005

(30) Foreign Application Priority Data
Oct. 21, 2002 (DE) ................. 102 48 991

(51) Int. Cl.
*G06F 17/10* (2006.01)
*G05B 13/02* (2006.01)
(52) U.S. Cl. .............. 703/2; 700/29; 700/169
(58) Field of Classification Search .......... 703/2, 703/6, 18; 700/29, 169, 178, 182, 99
See application file for complete search history.

(56) References Cited

U.S. PATENT DOCUMENTS

| | | | |
|---|---|---|---|
| 4,977,529 A * | 12/1990 | Gregg et al. | 703/18 |
| 6,789,054 B1 * | 9/2004 | Makhlouf | 703/6 |
| 6,847,854 B2 * | 1/2005 | Discenzo | 700/99 |

FOREIGN PATENT DOCUMENTS

DE 197 39 559 A1 3/1999
DE 101 14 811 A1 10/2002

OTHER PUBLICATIONS

Lo. C.C. A Tool-Path Control Scheme for Five-Axis Machine Tools, International Journal of Machine Tools and Manufacture, vol. 42, Iss. 1, Jan. 2002, pp. 79-88.*
Poignet et al., P. Modeling, Simulation and Control of High speed Machine Tools Using Robotics, Mechatronics,vol. 12, Iss. 3, Apr. 2002, pp. 461-487.*
Branicky et al., M.S. A Unified Framework for Hybrid Control: Model and Optimal Control Theory, IEEE Transactions on Automatic Control, vol. 43, No. 1, Jan. 1998, pp. 31-45.*
Muller et al., J. Modeling, Simulation, and MOdel-Based Control of the Walking Machine ALDURO, IEEE/ASME Transactions on Mechatronics, vol. 5, No. 2,, Jun. 2000, pp. 142-152.*
"Virtuelle Werkzeugmaschinen für die Simulation" (*Virtual Machine Tools for use in Simulation*) in the online journal wt Werkstattstechnik (*Workshop Technology*), vol. 92 (2002), No. 5, pp. 205-209.
"Echtzeitfähige Maschinenmodelle" (*Realtime-capable Machine Model*) in the online journal wt Werkstattstechnik (*Workshop Technology*), vol. 92, (2002), No. 5, pp. 187-193.

* cited by examiner

*Primary Examiner*—Russell Frejd
(74) *Attorney, Agent, or Firm*—Henry M. Feiereisen

(57) ABSTRACT

An apparatus and method for simulating the behavior of the drive system and the mechanism of machine tool or production-line machine by use of mathematical models of the drives and the mechanisms of the driven mechanical elements of the machine are disclosed. Preferably actual values for regulated and unregulated axes are calculated at the same time using NC- and PLC-models, respectively by an auxiliary computer using desired values provided by a digital controller. The actual values are then supplied to a mechanism model, preferably a geometric kinematic model, which produces a state signal that is fed back to the digital controller, preferably in real time. The result is an efficient, easy and cost-effective simulation that closely approximates reality and can be provided in real-time.

12 Claims, 2 Drawing Sheets

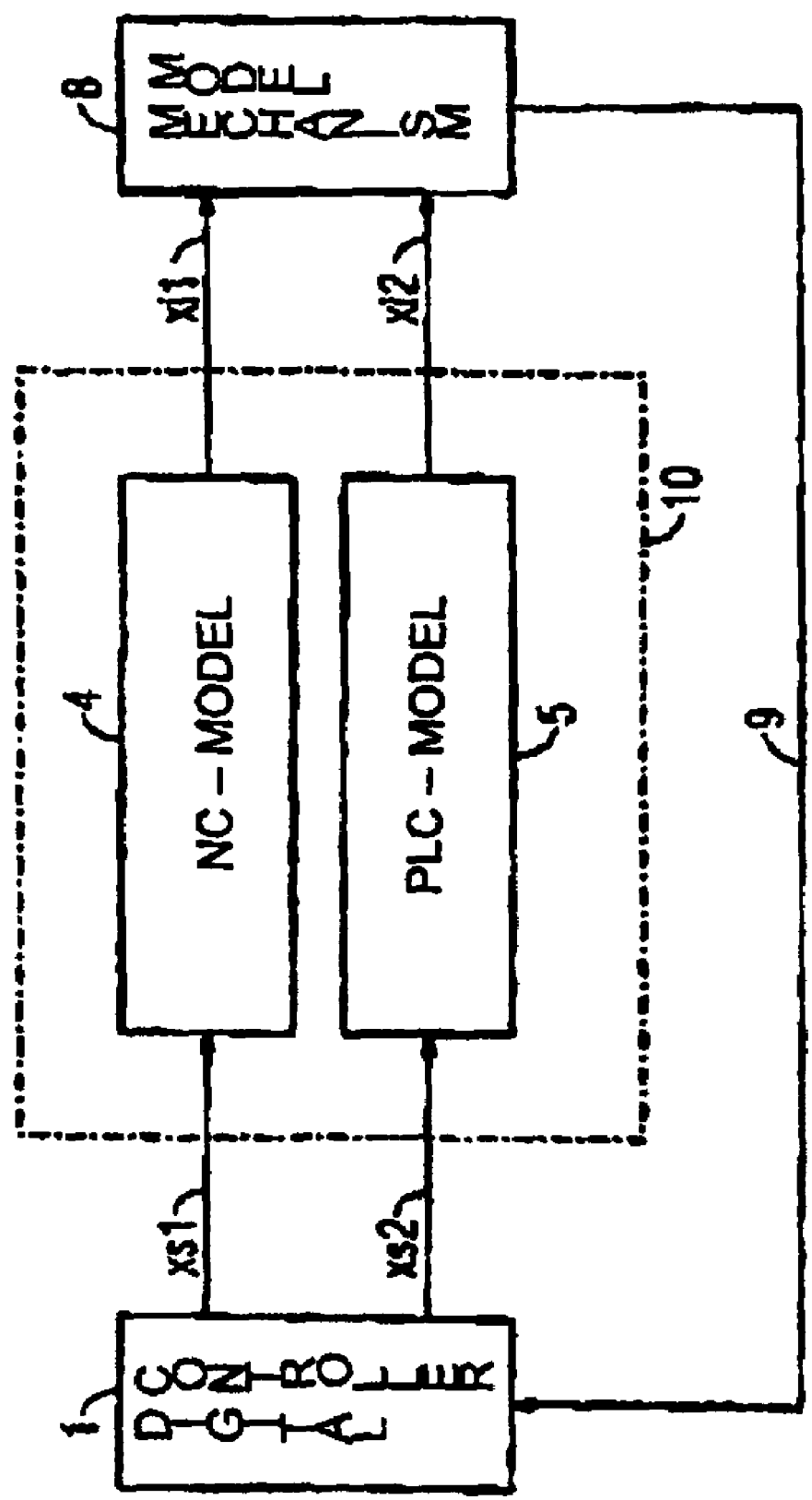

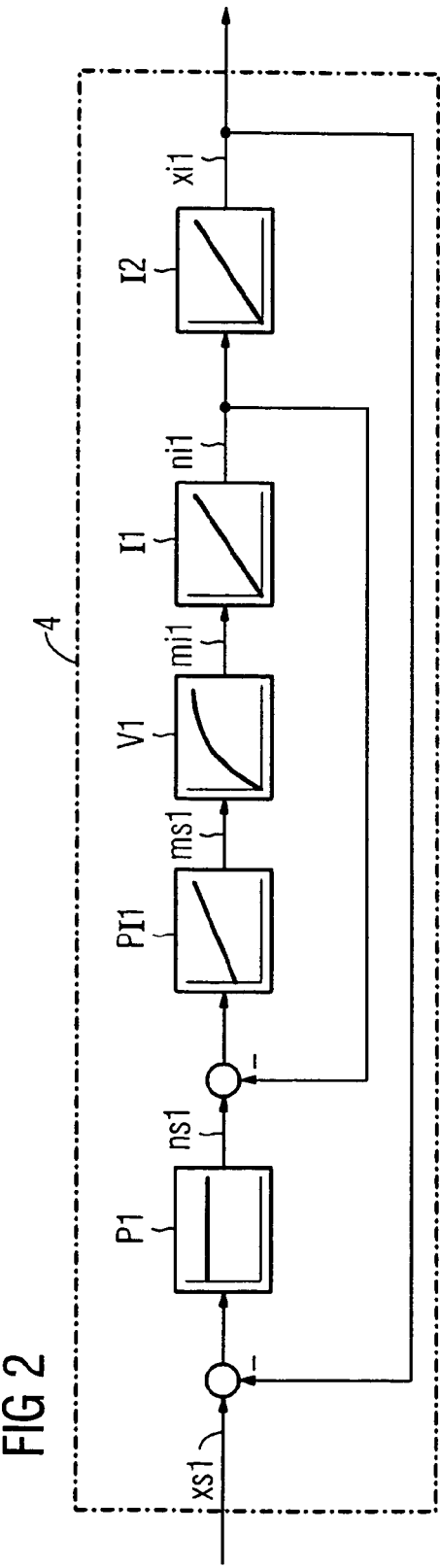
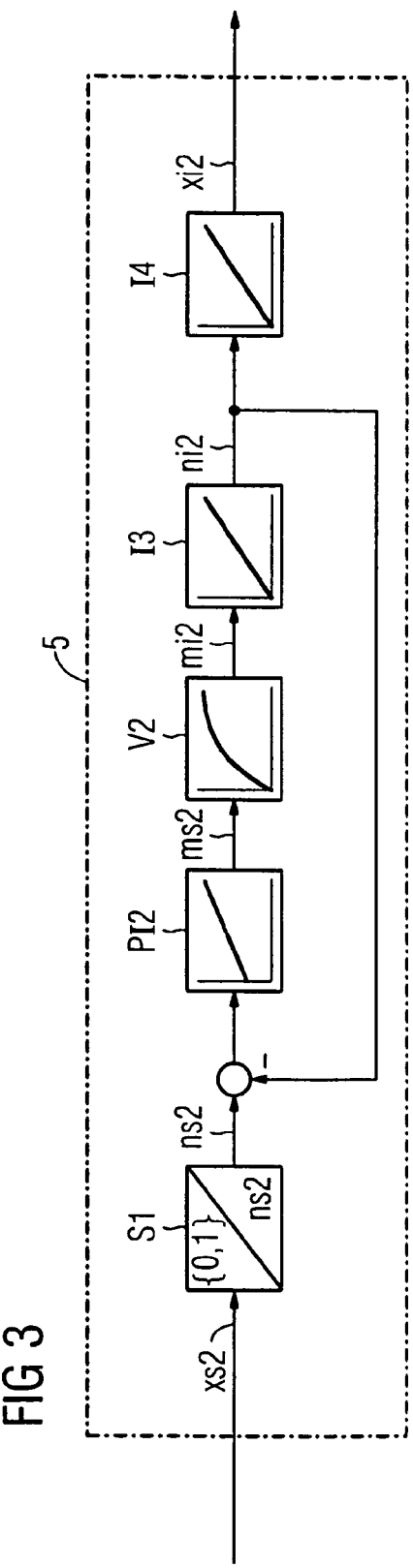

APPARATUS AND METHOD FOR SIMULATION OF THE CONTROL AND MACHINE BEHAVIOR OF MACHINE TOOLS AND PRODUCTION-LINE MACHINES

CROSS-REFERENCES TO RELATED APPLICATIONS

This application claims the priority of German Patent Application, Serial No. 102 48 991.2, filed Oct. 21, 2002, pursuant to 35 U.S.C. 119(a)–(d), the disclosure of which is incorporated herein by reference.

BACKGROUND OF THE INVENTION

The present invention relates to a method and apparatus by which the actual parameters of a machine's operations can be calculated from theoretical values with the help of models of the drive systems and of the mechanism of the machine.

With the increasing product-quality and economic-efficiency requirements being placed on machine-tool and production-line machine, including robots, the complexity of these machines is constantly increasing. Novel machine kinematics and complex mechanical-electronic functions require greater functional efficiency in the mechanism, drivers and control. However, this is not always easy to design and implement. Because the increasingly urgent need to know the productivity of a machine during the product development process, manufacturers realize that the exact responses of control signals, sensor signals and individual movements, previously used for collision control, provide simulation-supported machine evaluation and optimization. For this purpose, the simulation must replicate the machine's mechanical response and the response of the drivers, as well as the operation of the controller. Only in that way can the response times of the mechanism, the drivers and the digital controller be exactly modeled, for simulating numerically-controlled (NC) operations or tool changing operations, for example.

Different types of models employ different levels of detail in modeling the mechanical response of machine tools at present, for example:

geometric kinematics models that consider only the geometry of the machine's elements, not their masses and elasticities, equivalence models that consider interconnected functional building blocks, Petri-nets, for example, rigid many-body systems that consider flexible connecting elements, multiple-mass models that consider mass and elasticity in the drive train, flexible many-body systems, and FE-models with full discretization of the mechanism.

Up to now combinations of the different mechanical models that describe the functions of the control and drive technology in a machine have been limited to particular types of axis elements: only combinations of position-controlled axes, for example.

The article "Virtuelle Werkzeugmaschinen für die Simulation" (*Virtual Machine Tools for use in Simulation*) in the online journal wt Werkstattstechnik (*Workshop Technology*), vol. 92 (2002), no. 5, pages 205–209, an operation that applies the coupling of control techniques and simulation systems for various axes is disclosed. Since in that operation the modeling of the drive means is neglected and the desired and actual values are implicitly set to be identical, a realistic representation of the machine's kinematic response to motion cannot be achieved that way.

The article "Echtzeiffähige Maschinenmodelle" (*Real-time-capable Machine Model*) in the online journal wt Werkstattstechnik (*Workshop Technology*), vol. 92 (2002), no. 5, pages 187–193, discloses in this connection a drive-model and control-model, as well as a static weight-based model and a dynamic many-body model.

In general, a machine's controller can be integrated into a model used for simulation through a software simulation of the controller. Alternatively, a copy of the original control hardware and its original software can be used by the simulation. A numerical-control (NC) type of controller is essentially a numerical-control kernel (NCK) that guides controlled axes that are NC-operated using combined interpolations, interpolations representing the operation of a control circuit, for example.

In contrast, a programmable logic control (PLC) type of controller generally guides otherwise unregulated axes: a tool changer, for example. However, in the case of one control application, a PLC control unit guides regulated axes and, as a result, PLC-type control can integrate regulated axes using combined interpolations, interpolations for curve tracing for example. Transverse axes and/or conveyor axes are also provided with PLC controllers whether they are regulated or unregulated.

It would therefore be desirable and advantageous to provide an improved realtime-capable machine simulator in which mass and geometrical characteristics of the mechanical components of the machine and their respective drive systems, both regulated or unregulated, are simulated, regardless of whether they are have different types of controllers, while integrating in the simulator all control components.

SUMMARY OF THE INVENTION

According to one aspect of the present invention, an apparatus for simulation of the mechanical behavior of the mechanism of machine tools or production-line machines having multiple drive controllers for driving multiple axes, includes a digital controller producing respective desired axis values, an auxiliary computer connected to the digital controller for receiving the desired axis values from the digital controller, wherein the auxiliary computer includes mathematical model means for calculating respective actual axis values from the respective desired axis values simultaneously using mathematical models of drive controllers of the respective axes, whereby the mathematical models includes models of both regulated and unregulated drive controllers, and using the desired axis values, and a mechanism model unit for generating a state signal using the actual axis values produced by the mathematical models of the drive controllers of the respective axes, wherein the mechanism model unit is connected for receiving the actual axis values from the mathematical model means and for supplying the state signal to the digital controller as feedback, whereby both regulated and unregulated axes of the machine are simulated simultaneously.

The present invention resolves prior art shortcomings by providing an apparatus wherein a digital controller for a mechanism is adapted to provide a desired axis parameter to an auxiliary computer for an axis in the mechanism.

The auxiliary computer is adapted to compute the actual axis value for that axis corresponding to the desired axis parameter and apply it to a model of the mechanism. Feedback signals are generated by the model of the mechanism from this computed actual value and supplied to the digital controller by the model of the mechanism. Regulated axes and unregulated axes are simultaneously simulated by the auxiliary computer.

An advantage of the present invention resides in the combination of closed-loop control, such as that provided by PLC and NC controllers, with drive systems and machine models including sensor technology, that can be adapted for use with any axis elements of the machine, both regulated or unregulated axes. Only this combination makes it possible for actual axis values simultaneously produced for the respective drive systems in the mechanism to be processed by a model of the mechanism, resulting in a simulation of the mechanism's response that preserves a good approximation of reality.

In particular, the combination of control technology, drive technology and mechanism models are applied together for any type of axis: for an axis regulated as to position and/or speed and/or momentum, for example, or for an unregulated axis; and the desired parameters for the digitally-controlled machines are controlled by the outputs of NC- and PLC-control models. The result is that machine components subject to different types of control are thus brought together in a single model through the modeling of their respective drive technologies. Significant characteristics of the machine influence the control cycle of the drive models, such as the mass parameters for modeling real acceleration and speed, for example.

According to another feature of the present invention, the digital controller may be simulated or emulated by an auxiliary computer or a computer that is separate from the auxiliary computer. Therefore, despite frequent differences in the machine-related control hardware, an apparatus according to the invention can be assembled with identical control hardware, because the original digital controller is not used by the simulator.

According to another feature of the present invention, the simulation may be configured to operate in real time. Providing a simulation that is carried on in real time permits the observer to see a representation of the production process that is accurately timed.

According to another feature of the present invention, the cycle-time of the digital controller can be increased. Advantageously, in the event that the auxiliary simulation computer does not have sufficient computing capacity for a real-time simulation, its capacity is advantageously extended if the cycle time of the digital controller is raised and the digital controller is slowed down, in effect, forcing a uniform scaling of the time base of the simulation as a result.

According to another feature of the present invention, the auxiliary computer may calculate the state variable from the model of the over-all mechanism, to provide a compact configuration for the simulation device.

According to another feature of the present invention, there may be provided a computation unit which is separate from the auxiliary computer to calculate the state variable from the model of the mechanism. In particular, to reliably provide real-time capability for the simulation using a auxiliary computer that has inadequate computing capacity, it is advantageous to let the computation of the state variable from the model of the over-all mechanism be performed by a computing unit that is separate from the auxiliary unit.

According to another aspect of the present invention, a method for simulation of the mechanical behavior of the mechanism of machine tools or production-line machines having multiple drive controllers for driving multiple axes, includes the steps of producing respective desired axis values, calculating respective actual axis values from the respective desired axis values simultaneously using mathematical models of drive controllers of the respective axes, wherein the mathematical models include models of both regulated and unregulated drive controllers, and using the desired axis values, generating a state signal using the actual axis values produced by the mathematical models of the drive controllers of the respective axes and mechanism model means for generating a state signal, wherein the mechanism model means are connected for receiving the actual axis values from the mathematical model means, and supplying the state signal to the digital controller as feedback, whereby both regulated and unregulated axes of the machine are simulated simultaneously.

BRIEF DESCRIPTION OF THE DRAWINGS

Other features and advantages of the present invention will be more readily apparent upon reading the following detailed description of a currently preferred embodiment that provides an example of the invention, with reference to the accompanying drawing in which:

FIG. 1 is a schematic block diagram of a simulation in accordance with the invention;

FIG. 2 is a detailed schematic view of the NC-model of FIG. 1, which models a regulated axis;

FIG. 3 is a detailed schematic view of the PLC-model of FIG. 1 which models an unregulated axis.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic block diagram of a simulation in accordance with the invention, including a digital controller 1, which outputs a desired NC-axis value "xs1" for each numerically-controlled (NC) axis to a related NC-model and outputs a desired PLC-axis value "xs2" for each programmable-logic controlled (PLC) axis to a related PLC-model. For the sake of clarity, only one NC-model and only one PLC-model are shown. This illustrates the application of the apparatus and method in accordance with the invention to a hypothetical machine having a two-axis mechanism.

The numerical calculation of the NC-model 4 and the PLC-model 5 takes place in an auxiliary computer 10 that is connected to the digital controller 1. The NC-model outputs a simulated actual NC-axis value xi1 to the mechanism model 8, which is a geometrical kinematic model in this example. The PLC-model 5 outputs a simulated actual PLC-axis value xi2 for the axis to the mechanism model 8. The mechanism, which may have just the two NC and PLC axes, or may include an entire production process, is modeled with the help of the geometrical kinematic model 8 of that mechanism.

A virtual-sensor and sensing technology are integrated into the geometric kinematic model 8. For example virtual state sensors and virtual limit sensors are integrated into the component structures of the geometric kinematic model, and actuation of one of these virtual sensors indicates a collision between a part of one of the simulated axes and a feeler gauge, for example, which produces a signal that is coupled as feedback to the digital controller 1. For the sake of clarity, FIG. 1 shows only one of the state signals 9 that are output to the digital controller 1 from the geometric kinematic model 8 that is used in this example.

In the digital controller 1 the desired values, a desired NC-value as well as a desired PLC-value in this example, are calculated in a suitable manner well known in the art, using a control program and the parameters on which the digital control of the machine is based, as well as the state signals 9 provided by the mechanism model 8. Subsequently, the corresponding NC/PLC desired values are output to the NC-model 4 and the PLC-model 5, respectively. The desired PLC-values can be applied in the form of binary signals, for example, to move tools to a position required for changing the tool or for rotation of the tool about a given axis, movements that can be carried out without requiring intervention by the controller during the movement.

The NC-model 4 and the PLC-model 5, respectively, compute a respective actual NC-value $xi1$ or PLC-value $xi2$ for a given axis from the respective desired NC-value $xs1$ or PLC-value $xs2$. The essential mechanical characteristics of these elements of the mechanism, for example the mass of the axes as well as the specifications of their drive systems, are already represented in the individual NC-model 4 or PLC-model 5 model assigned to each axis. As a result, although only an idealized machine, that is, a machine wherein elements have no specified mass, for example, is represented or visualized in the final mechanism models 8 that simulate the entire mechanism, in the final mechanism models 8 used for simulation of a machine in accordance with the invention employ axis element specifications that have a closer approximation to the axis elements' actual acceleration, to the axis elements' actual physical behavior, because of the use of the NC-model 4 or PLC-model 5 to provide inputs to these mechanism models 8.

FIG. 2 shows details of an NC-model 4 of an axis, in the form of a schematic functional block diagram. The mechanical characteristics of an axis and its driver are represented in the form of control circuits. The current estimate of the desired NC-value $xs1$ coming from the controller 1 and an actual NC-value $xi1$ produced at the output of the NC-model 4 are combined to produce a differential representation of these two signals that is supplied to the input side of a proportional element P1. Proportional element P1 produces a calculated velocity value $ns1$ on its output side, from which an actual velocity value $ni1$ is subtracted. The velocity offset signal thus produced is supplied to a proportional integration element PI1, which produces a desired momentum value $ms1$ at its output. From the desired momentum value $ms1$ an actual momentum value $mi1$ is calculated with the help of a delay element V1. Subsequently, from the actual momentum value $mi1$ the NC model 4 calculates the actual speed $ni1$ using the first integration element I1, and calculates the current actual NC-value $xi1$ of the axis using both integration elements I1 and I2. Subsequently these two values, $ni1$ and $xi1$, supply feedback within the NC-model and the current actual NC-value $xi1$ becomes an input variable for the mechanism model 8.

FIG. 3 shows details of a PLC-model 5 for an axis in the form of a schematic functional block diagram. A binary desired PLC-value $xs2$ produced by the controller 1 is supplied to a switch element S1. When the binary desired PLC-value $xs2$ changes from a logical "0" to a logical "1", a desired velocity value $ns2$ is provided at the output of the switch element S1. An actual velocity value $ni2$ produced within the PLC model 5 is subtracted from that desired velocity value $ns2$ and the difference is supplied to a proportional integration element PI2, which produces a desired momentum value $ms2$ at its output. From the desired momentum value $ms2$ an actual momentum value $mi2$ is calculated with the help of a delay element V2. Subsequently, from the actual momentum value $mi2$ the PLC model 5 calculates the actual speed value $ni2$ using the first integration element I2, and calculates the actual NC-value $xi2$ of the axis using both integration elements I3 and I4. Subsequently the actual speed value $ni2$ supplies feedback within the PLC-model and the current actual PLC-value $xi2$ becomes an input variable for the mechanism model 8.

The type of control circuits shown in FIG. 2 and FIG. 3 provide output values $xi1$, $xi2$ that are close approximations to the actual axis position values produced by the axis's actual velocity and acceleration. However, it will be readily apparent to one skilled in the art that, through adaptations of the necessary elements shown in FIG. 2 and FIG. 3, multiple different models are possible that are not shown here for the sake of clarity and simplicity. The determination of the integration time constant, proportionality factors and/or conforming constants that are needed in these models can readily, in the alternative, be either theoretically determined or be determined by measurement. As a general rule measurement is the easier and more practical alternative.

Once again it is important to note that the two control circuits shown are presented herein as particular embodiments for the purpose of illustration. One skilled in the art can find materially more complex models in the existing technical literature that can improve the correspondence to reality of a simulation in accordance with the present invention.

However, the simplicity of the geometrical kinematic mechanism model and the NC- and PLC-models described here has its own practical advantages. The NC/PLC-models 4 and 5 and the geometrical kinematic model are so efficient that an ideal realtime-capable simulator could be designed that has no asynchronicity between the digital controller 1 and the NC/PLC-models 4 and 5, and between the the NC/PLC-models 4 and 5 and the mechanism model 8. For implementing realtime-capability the NC/PLC models 4 and 5 and the mechanism model 8 need to take no longer than one interpolation cycle (IPO-cycle) of the NCK operation, or one cycle for the PLC-model. This can be slowed, if a reduced cycle rate is implemented by the digital controller, as noted above. However, in near-realtime operations it should be understood that when the length of the cycle is substantially increased, the result is that the synchronization of the digital controller 1, the NC/PLC-models 4 and 5, and the mechanism model 8 forces a uniform scaling of the time base.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims, and includes equivalents of the elements recited therein.

What is claimed is:

1. Apparatus for simulation of the mechanical behavior of the mechanism of machine tools or production-line machines having multiple drive controllers for driving multiple axes, said apparatus comprising:
a digital controller, said digital controller being adapted for producing respective desires axis values;
an auxiliary computer connected to the digital controller for receiving said desired axis values from the digital controller, said auxiliary computer including mathematical model means for calculating respective actual axis values from said respective desired axis values simultaneously using mathematical models of drive controllers of the respective axes, said mathematical models including models of both regulated and unregulated drive controllers, said mathematical models using said respective desired axis values; and
mechanism model means for generating a state signal using said actual axis values produced by said mathematical models of said drive controllers of the respective axes, said mechanism model means connected for receiving said actual axis values from said mathematical model means and for supplying said state signal to said digital controller as feedback, whereby both regulated and unregulated axes of the machine are simulated simultaneously,
at least one of the multiple axes having NC-axis drive control and at least one of the multiple axes having a PLC-axis drive control, so that at least one NC-model and at least one PLC-model are used to compute the respective actual axis values, and wherein a geometric kinematic mechanism model of the behavior of the axes in the mechanism of the machine is used to produce at least one state signal calculated using said respective actual values.

2. The apparatus of claim 1, wherein a simulation of said digital controller is calculated by the auxiliary computer.

3. The apparatus of claim 1, and further comprising computing means for calculating a simulation of the digital controller, said computer means being separate from said auxiliary computer.

4. The apparatus of claim 1, wherein an emulation of said digital controller is calculated by the auxiliary computer.

5. The apparatus of claim 1, and further comprising computing means for calculating an emulation of the digital controller, said computer means being separate from said auxiliary computer.

6. The apparatus of claim 1, wherein the simulation is carried out in real time.

7. The apparatus of claim 1, and further comprising means for increasing a cycle time of the digital controller.

8. The apparatus of clam 1, wherein said mechanism model is calculated by the auxiliary computer.

9. The apparatus of claim 1, and further comprising computing means for calculating said mechanism model, said computing means being separate from said auxiliary computer.

10. Apparatus for simulating the behavior of the mechanisms and drive control systems of a machine including at least two axes having respective different types of drive control systems and a digital controller, said digital controller in each cycle of the controller producing a respective desired axis value for each axis, said apparatus comprising:
auxiliary computer means for calculating respective actual values for the axes within a cycle of the digital controller using respective different types of axis drive control models and the respective desired axis values, said respective axis drive control models corresponding to the type of drive control provided for the respective axis; and
a mechanism model of the behavior of the axes in the mechanism of the machine, said mechanism model including at least one virtual sensor model producing a state signal calculated using said respective actual values, said state signal being supplied as feed back to the digital controller, at least one of the multiple axes having axes having NC-axis drive control and at least one of the multiple axes having a PLC-axis drive control, so that at least one NC-model and at least one PLC-model are used to compute the respective actual axis values, and wherein a geometric kinematic mechanism model of the behavior of the axes in the mechanism of the machine is used to produce at least one state signal calculated using said respective actual values.

11. A method for simulation of the mechanical behavior of the mechanism of machine tools or production-line machines having multiple drive controllers for driving multiple axes, said method comprising the steps of:
producing respective desired axis values;
calculating respective actual axis values from the respective desired axis values simultaneously using mathematical models of drive controllers of the respective axes, said mathematical models including models of both regulated and unregulated drive controllers, said mathematical models using said desired axis values;
generating a state signal using said actual axis values produced by said mathematical models of said drive controllers of the respective axes and mechanism model means for generating a state signal, said mechanism model means being connected for receiving said actual axis values from said mathematical model means; and
supplying said state signal to said digital controller as feedback, whereby both regulated and unregulated axes of the machine are simulated simultaneously, at least one of the multiple axes having NC-axis drive control and at least one of the multiple axes having a PLC-axis drive control, so that at least one NC-model and at least one PLC-model are used to compute the respective actual axis values, and wherein a geometric kinematic mechanism model of the behavior of the axes in the mechanism of the machine is used to produce at least one state signal calculated using said respective actual values.

12. A method for simulating the mechanical behavior of the mechanism of machine tools or production-line machines having multiple drive controllers for driving multiple axes, and a digital controller, said digital controller in each cycle of the controller producing a respective desired axis value for each axis, said method comprising the steps of:
calculating respective actual axis values for the axes within a cycle of the digital controller using respective different types of axis drive control drive models corresponding to the type of control provided for the respective axis and the respective desired axis values; and calculating a mechanism model of the behavior of the axes in the mechanism of the machine, said mechanism model providing at least one state signal calculated using said respective actual axis values, said state signal being supplied as feed back to the digital controller, at least one of the multiple axes having NC-axis drive control and at least one of the multiple axes having a PLC-axis drive control, so that at least one NC-model and at least one PLC-model are used to compute the respective actual axis values, and wherein a geometric kinematic mechanism model of the behavior of the axes in the mechanism of the machine is used to produce at least one state signal calculated using said respective actual values.

* * * * *